United States Patent
Song

(10) Patent No.: US 8,197,963 B2
(45) Date of Patent: Jun. 12, 2012

(54) LITHIUM ION SECONDARY BATTERY

(75) Inventor: Minho Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 895 days.

(21) Appl. No.: 11/412,403

(22) Filed: Apr. 26, 2006

(65) Prior Publication Data

US 2006/0263684 A1 Nov. 23, 2006

(30) Foreign Application Priority Data

Apr. 27, 2005 (KR) ........................ 10-2005-0035302

(51) Int. Cl.
*H01M 2/08* (2006.01)
*H01M 2/36* (2006.01)
*H01M 2/12* (2006.01)
*H01M 10/48* (2006.01)

(52) U.S. Cl. .............. 429/163; 429/53; 429/72; 429/90; 429/93; 429/96; 429/100; 429/122; 429/130; 429/135; 429/175; 429/177; 429/181

(58) Field of Classification Search ............ 429/94, 429/180, 53, 72, 90, 93, 96, 100, 122, 130, 429/135, 163, 175, 177, 181
See application file for complete search history.

(56) References Cited

U.S. PATENT DOCUMENTS

| | | | |
|---|---|---|---|
| 5,348,813 A | | 9/1994 | Bohmer et al. |
| 6,432,575 B1 * | | 8/2002 | Yamagami ................ 429/100 |
| 7,682,070 B2 * | | 3/2010 | Burton ........................ 368/294 |
| 2002/0045093 A1 * | | 4/2002 | Imamura et al. ............. 429/96 |
| 2002/0142195 A1 * | | 10/2002 | Ehara ............................. 429/7 |
| 2003/0219650 A1 * | | 11/2003 | Saruwatari et al. ........ 429/218.1 |
| 2004/0101747 A1 | | 5/2004 | Bushong et al. |
| 2004/0185331 A1 * | | 9/2004 | Saruwatari et al. ............ 429/86 |
| 2006/0099500 A1 * | | 5/2006 | Jeon ............................. 429/174 |

FOREIGN PATENT DOCUMENTS

| | | | |
|---|---|---|---|
| JP | 64-012472 | | 1/1989 |
| JP | 01-304657 | | 12/1989 |
| JP | 03-028052 | | 6/1996 |
| JP | 08-255597 | | 10/1996 |
| JP | 2003-223872 | | 8/2003 |
| KR | 20-0155796 Y1 | | 6/1999 |
| KR | 10-2001-0038813 | | 5/2001 |
| KR | 1020010038813 | * | 5/2001 |
| KR | 1020010038813 A | * | 5/2001 |
| KR | 10-1999-0066033 | * | 6/2001 |
| KR | 10-2005-0042779 | | 5/2005 |

OTHER PUBLICATIONS

Korean Patent Abstracts, Publication No. 1020010038813 A, dated May 15, 2001, in the name of Gwang Won Seo. English machine translation of JP 03-028052 listed above.
Japanese Office action dated Dec. 1, 2009 issued by the Japan Patent Office for corresponding Korean Patent Application No. 10-2005-0035302 listing the cited references in this IDS.

* cited by examiner

*Primary Examiner* — Ula C Ruddock
*Assistant Examiner* — Amanda Barrow
(74) *Attorney, Agent, or Firm* — Christie, Parker & Hale, LLP

(57) ABSTRACT

A lithium ion secondary battery includes an electrode assembly having a first electrode plate, a second electrode plate, and a separator interposed therebetween; a case in which the electrode assembly is received; a cap plate formed with a terminal hole and an electrolyte injection hole; and a washer installed at an upper portion of the cap plate, the washer having at least one transparent part formed thereon or having a transparent part formed on an entire surface thereof.

6 Claims, 4 Drawing Sheets

LITHIUM ION SECONDARY BATTERY

CROSS REFERENCE TO RELATED APPLICATION

This application claims priority to and the benefit of Korean Patent Application No. 10-2005-0035302, filed on Apr. 27, 2005, in the Korean Intellectual Property Office, the entire content of which is incorporated herein by reference.

BACKGROUND

FIG. 1 shows a typical lithium ion secondary battery. Referring to FIG. 1, a typical secondary battery 10 includes a can 11, an electrode assembly 12 accommodated in the can 11, a cap assembly 100 coupled to an upper opened portion of the can 11, a lead 200 for coupling an electrode terminal 120 of the cap assembly 100 to a protection circuit 220, and a washer 230 coupled to an upper portion of a cap plate 110 provided in the cap assembly 100.

In the lithium ion secondary battery 10, the can 11 is a container formed of metal substance and has a substantially hexahedral shape having an open upper portion. The can 11 is formed by a manufacturing method, such as a deep drawing method. The can 11 contains an electrolyte (not shown) and the electrode assembly 12 including a first electrode plate 13, a separator 14 and a second electrode plate 15. The electrode assembly 12 is inserted through the open upper portion of the can 11, and the open upper portion is sealed by the cap assembly 100.

The cap assembly 100 includes a flat type cap plate 110 having a size and shape corresponding to those of the open upper portion of the can 11. The cap plate 110 is formed at a center portion thereof with a terminal hole 111, into which an electrode terminal 120 is inserted, and a tube type gasket 130 for electrically insulating the electrode terminal 120 from the cap plate 110 is installed at an outer side of the electrode terminal 120 passing through the center portion of the cap plate 110. At a lower surface portion of the cap plate 110 near the terminal hole 111 of the cap plate 110, an insulation plate 140 is arranged. At a lower surface of the insulation plate 140, a terminal plate 150 is arranged to electrically couple to the electrode terminal 120.

The cap plate 110 further includes a safety vent 190 enabling gas to release when the inner pressure of the battery increases to reach up to more than a predetermined pressure. The safety vent 190 is formed at one side thereof with an electrolyte injection hole 112 in order to inject an electrolyte into the can 11. The electrolyte injection hole 112 is sealed by pressing a plug 160 therein.

At an upper portion of the cap plate 110, a washer 230 is provided for insulating a lead 200, connected to the electrode terminal 120 which is connected to the second electrode tap 17, from the cap plate 110 connected to the first electrode tap 16. The lead 200 electrically connected to the lead electrode terminal is located at an upper portion of the other side of the safety vent 190 and is electrically connected to the protection circuit 220.

However, since the washer 230 is located at the upper portion of the cap plate 110, the electrolyte injection hole 112 and the safety vent 190 are hidden by the washer 230. Accordingly, a leak of the electrolyte cannot be confirmed without removing the washer 230. Further, the worker must check the position of the safety vent 190 when assembling the battery and then the lead must be welded to the electrode terminal and the protection circuit toward the other side of the safety vent 190.

SUMMARY

A lithium ion secondary battery includes an electrode assembly having a first electrode plate, a second electrode plate, and a separator interposed therebetween; a case in which the electrode assembly is received; a cap plate formed with a terminal hole and an electrolyte injection hole; and a washer installed at an upper portion of the cap plate, the washer having at least one transparent part formed thereon.

In one embodiment, the at least one transparent part is formed at a location corresponding to the electrolyte injection hole. In another embodiment, a safety vent is further formed in the cap plate, and the at least one transparent part is formed at a location corresponding to the electrolyte injection hole and the safety vent.

The at least one transparent part may include transparent resin, which may include a material selected from group consisting of polyethylene, polypropylene, polytetrafluoroethylene (TEFLON), polyethylene terephthalate, and polybutylene terephthalate.

The battery may also include an insulating test material adjacent to at least one transparent part and to the electrolyte injection hole for sensing a leak of electrolyte from the electrolyte injection hole.

In one embodiment, the at least one transparent part is formed by punching the washer.

In another embodiment, the washer has a transparent part formed transparently over an entire surface thereof. The battery may further include an insulating test material adjacent to the washer and to the electrolyte injection hole for sensing a leak of electrolyte from the electrolyte injection hole. In one embodiment, the test material is a litmus paper.

BRIEF DESCRIPTION OF THE DRAWINGS

The above and other features and aspects of the claimed invention will be more apparent from the following detailed description taken in conjunction with the accompanying drawings.

DETAILED DESCRIPTION

Figure 1:
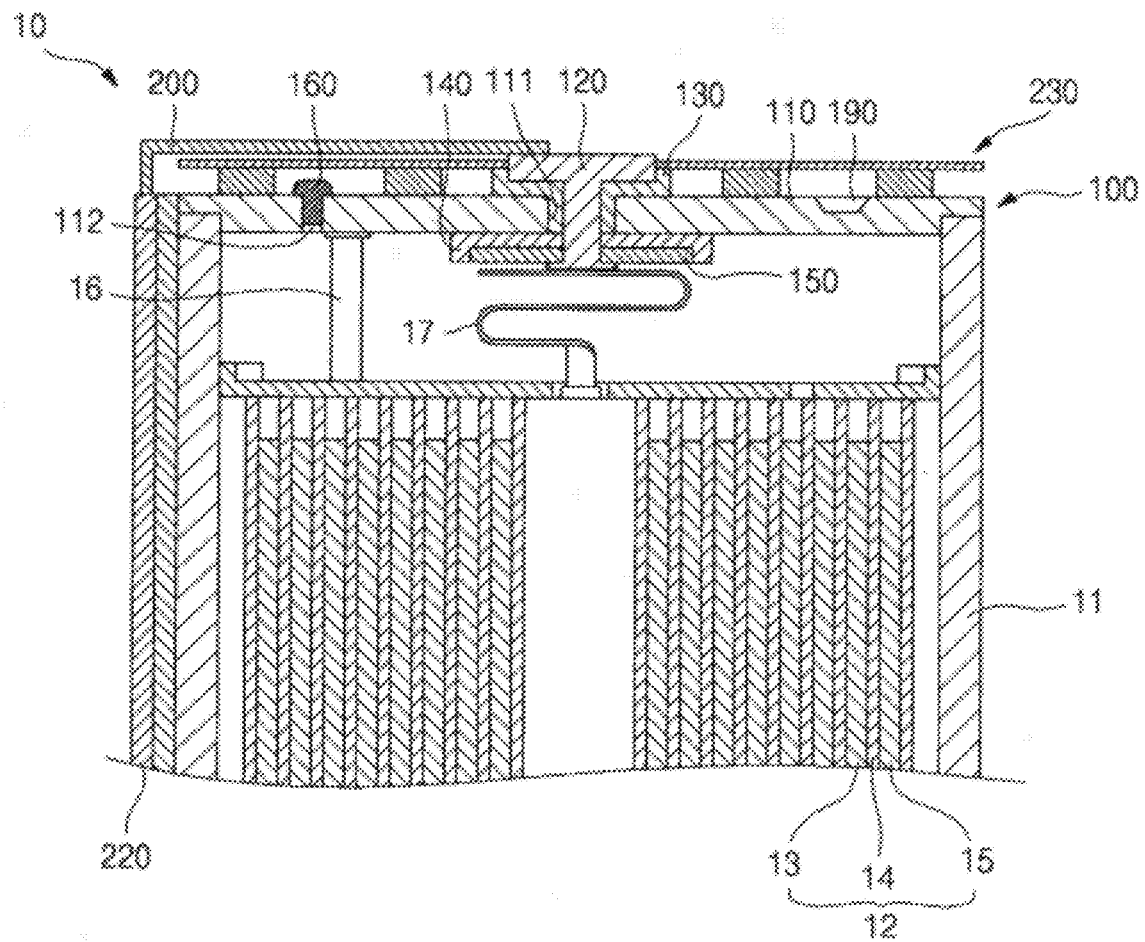
FIG. 1 is a sectional view illustrating a conventional lithium ion secondary battery.

Hereinafter, various embodiments of the present invention will be described with reference to the accompanying drawings. In the following description and drawings, the same reference numerals are used to designate the same or similar components, so repetition of the description on the same or similar components will be omitted.

Figure 2:
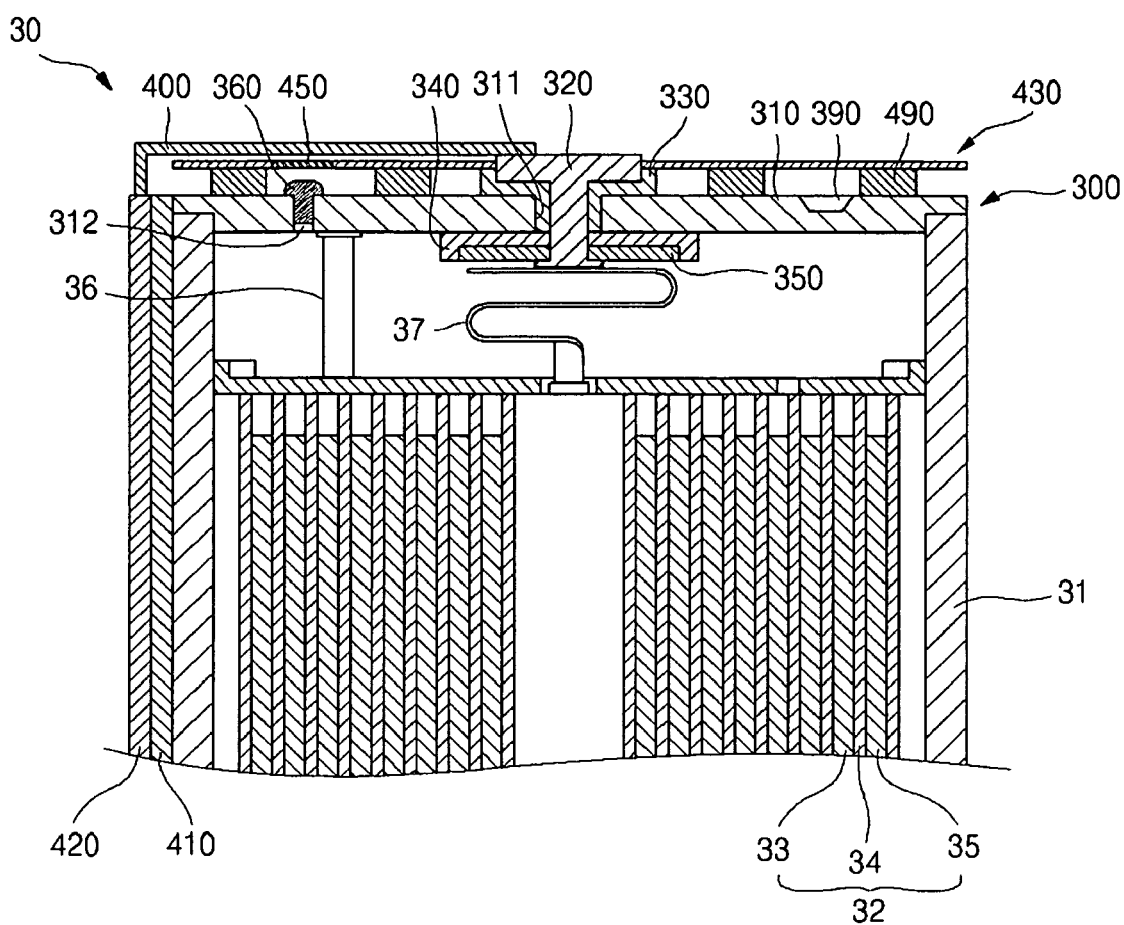
FIG. 2 is a sectional view illustrating a lithium ion secondary battery according to an embodiment of the present invention.
Figure 3:
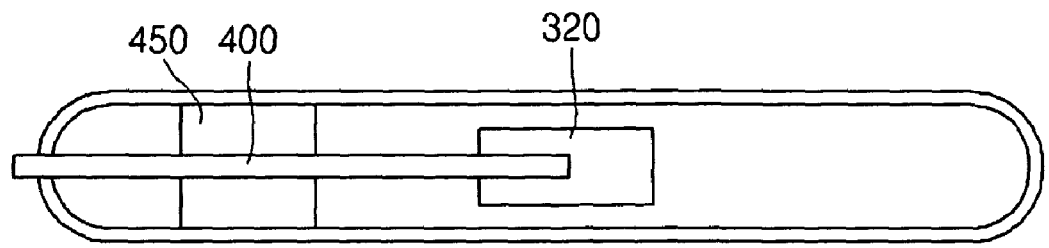
FIG. 3 is a plan view illustrating the lithium ion secondary battery according to the embodiment shown in FIG. 2.

FIG. 2 is a sectional view illustrating a lithium ion secondary battery according to an embodiment of the present invention, and FIG. 3 is a plan view illustrating the lithium ion secondary battery shown in FIG. 2.

Referring to FIG. 2 and FIG. 3, secondary battery 30 includes a can 31, an electrode assembly 32 accommodated in the can 31, a cap assembly 300 coupled to an open upper portion of the can 31, a lead 400 for coupling a second electrode terminal 320 of the cap assembly 300 to a protection circuit 420, and a washer 430 formed at an upper portion to insulate the lead 400 to the cap plate 310.

The electrode assembly 32 is formed by winding a first electrode plate 33, a second electrode plate 35 and a separator 34 interposed between the first electrode plate 33 and the second electrode 35. The first electrode plate 33 is electrically connected through a first electrode tap 36 to the cap plate 310, and the second electrode plate 35 is electrically connected through a second electrode tap 37 to the electrode terminal 320.

The can 31 may be made of an iron frame, but may also be made of aluminum or an aluminum alloy. Aluminum or aluminum alloy have intrinsic properties, such as its light weight so as to make the battery light and high erosion-resistance even in a long time use. The can 31 contains an electrolyte (not shown) and the electrode assembly 32 including the first electrode plate 33, a separator 34 and the second electrode plate 35. The electrode assembly 32 is inserted through the open upper portion of the can 31, and the open upper portion is sealed by the cap assembly 300.

The cap assembly 300 includes a substantially flat cap plate 310 having a size and shape corresponding to those of the open upper portion of the can 31. The cap plate 310 is formed at a center portion thereof with a terminal hole 311, into which the second electrode terminal 120 is inserted. A tube type gasket 330 for electrically insulating the electrode terminal 320 from the cap plate 310 is installed at an outer side of the electrode terminal 320 passing through the center portion of the cap plate 310. At an lower surface portion of the cap plate 310 near the terminal hole 311 of the cap plate 310, an insulation plate 340 is arranged. At a lower surface of the insulation plate 340, a terminal plate 350 is arranged to electrically couple to the electrode terminal 320.

The cap plate 310 further includes a safety vent 390 enabling gas to release from the battery when the inner pressure of the battery increases to more than a predetermined pressure. The safety vent 390 is formed at one side thereof with an electrolyte injection hole 312 in order to inject an electrolyte into the can 31. The electrolyte injection hole 312 is sealed by pressing a plug 360 therein. The plug 360, which may be in the shape of a ball, may be pressed into the electrolyte injection hole 312 through a pressing means such as a press moving up and down.

The electrode terminal 320 is connected to the lead 400, and the lead 400 is soldered on the protection circuit 420 to electrically connect to the electrode assembly 32. The protection circuit 420 is installed at a predetermined area of the can 31 and insulated with the can 31 by an insulator 410 in the lithium ion secondary battery. Further, the protection circuit 420 protects against over-charging and -discharging of voltage and current and electrical shorting of the electrode assembly 32.

In this embodiment, the lead 400 is located at an upper portion of the electrolyte injection hole 312. It is because a breakdown of the safety vent 390 is not easily performed so as to lower a safety of the battery when an inner pressure of the battery rises. The lead 400 is needed to insulate from the cap plate 310 coupled to the first electrode plate 33. Accordingly, the washer 430 formed as an insulator is provided at an upper portion of the cap plate 310.

Herein, in order to safely locate the washer 430 at the upper portion of the cap plate 310, a predetermined space is required between the washer 430 and the cap plate 310. That is, a supporter 490 is provided to the washer 430, and the supporter 490 of the washer 430 allows the washer 430 to be safely located at the cap plate 310 while securing the predetermined space between the washer 430 and the cap plate 310. The supporter 490 of the washer 430 can be formed at a predetermined space, and it is formed of an elastic substance such as sponge, but its substance is not limited in the present invention.

A transparent part 450 of the washer 430 is formed at a location corresponding to the electrolyte injection hole 360. Accordingly, it is possible to confirm a leak of the electrolyte without removing the washer 430. Further, the electrolyte injection hole 360 is formed at the other side of the safety vent 390 and the lead 400 is located at an upper portion of the transparent part 450 to allow a worker to indirectly check the location of the safety vent 390 to thereby improve an assembling process of the battery. The transparent part 450 may be formed of a transparent resin selected from one group including polyethylene, polypropylene, polytetrafluoroethylene (TEFLON), polyethylene terephthalate, and polybutylene terephthalate.

Figure 4:
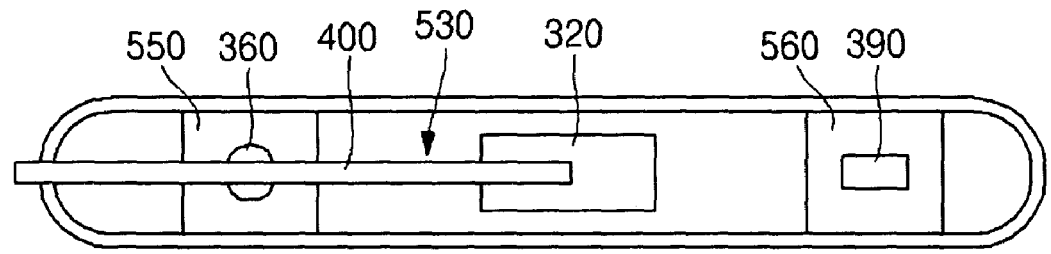
FIG. 4 is a plan view illustrating a lithium ion secondary battery according to another embodiment of the present invention.

FIG. 4 is a plan view illustrating a lithium ion secondary battery according to another embodiment of the present invention. Referring to FIG. 4, at a location of the washer 530 corresponding to the safety vent 390 and to the plug 360, transparent parts 550 and 560 are formed. Since the transparent parts 550 and 560 are formed at the location corresponding to the plug 360 (i.e. electrolyte injection hole) and the safety vent 390, it is possible to easily check a leak of the electrolyte without removing the washer 530. Further, since the location of the safety vent 390 can be easy checked, a process to check the location of the safety vent 390 is not needed. Accordingly, work efficiency becomes improved.

Figure 5:
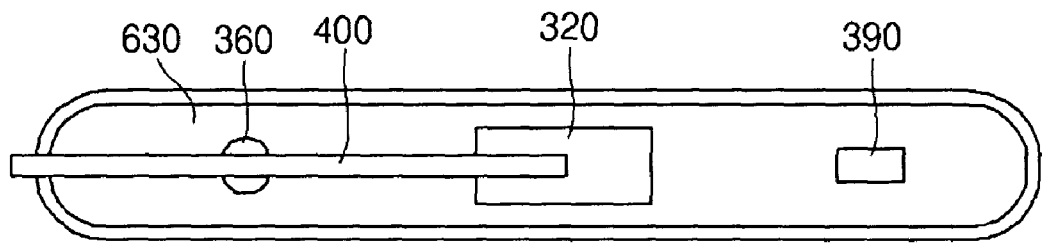
FIG. 5 is a plan view illustrating a lithium ion secondary battery according to an embodiment of the present invention.

In FIG. 5, the entire washer 630 is transparently formed. Herein, the washer 630 may be formed of a transparent resin. The transparent resin is selected from the group including polyethylene, polypropylene, polytetrafluoroethylene (TEFLON), polyethylene terephthalate, and polybutylene terephthalate. When the entire washer 630 is transparently formed, a leak of the electrolyte can be checked with the naked eye and the location of the safety vent 390 can be easily checked. Accordingly, it is possible to improve work efficiency.

Figure 6:
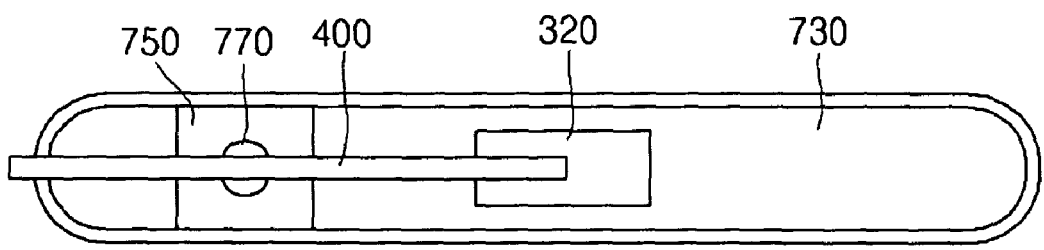
FIG. 6 is a plan view illustrating a lithium ion secondary battery according to a different embodiment of the present invention.

Referring to FIG. 6, at a location of the washer 730 corresponding to the electrolyte injection hole, a transparent part 750 is formed. Further, at an upper portion of the electrolyte injection hole, a test material 770 to cover the electrolyte injection hole and to enable checking of a leak of the electrolyte is installed.

A litmus paper may be used for the test material. When electrolyte is leaked during a process sealing the electrolyte injection hole, the litmus paper is stained with the electrolyte and hydrofluoric acid etc. included in the electrolyte, which cause the litmus paper to be changed to a pink color. The original state of the litmus paper can be differentiated depending on a substantial composition of the electrolyte. For instance, if the electrolyte has a weak acidity, a paper of white color representing neutrality and a paper of light blue color representing a weak alkali may be used.

Generally, lithium salt added in the electrolyte, such as $LiPF_6$ etc., forms hydrofluoric acid when reacting to ethylene carbonate in an initial charge of the battery, so that a probability that the electrolyte has a weak acidity is high.

Figure 7:
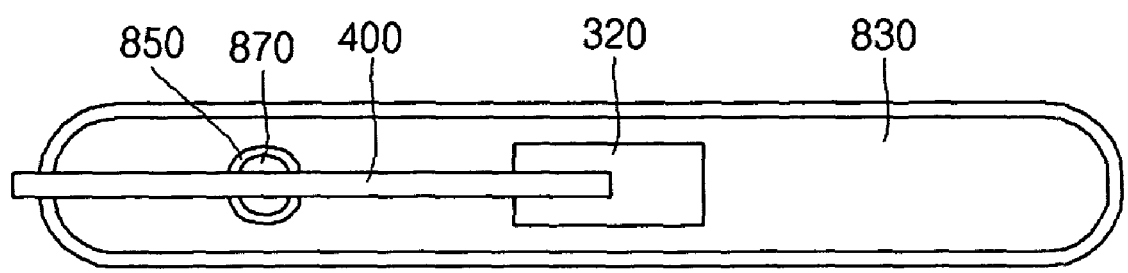
FIG. 7 is a plan view illustrating a lithium ion secondary battery according to yet another embodiment of the present invention.

As shown in FIG. 7, the washer 830 may be punched to make a hole 850 instead of forming the transparent part at the position corresponding to the electrolyte injection hole of the washer. The test material 870 may show through the hole 850 or the punched part can play a role to prevent an electrical short between the cap plate and the lead 400.

As mentioned above, according to some embodiments of the present invention, the entire washer or a part thereof may be transparently formed to easily check a leak of the electrolyte with the naked eye, so that there is an efficiency to improve a safety of the battery. In addition, a step for checking the location of the safety vent is not necessary, so that the location of the safety vent may be easily checked. Accordingly, there is an effect to improve an efficiency of assembling the battery.

Although several embodiments of the present invention have been described for illustrative purposes, those skilled in the art will appreciate that various modifications, additions and substitutions are possible, without departing from the scope and spirit of the invention as disclosed in the accompanying claims and their equivalents.

What is claimed is:

1. A lithium ion secondary battery, comprising:
   an electrode assembly having a first electrode plate, a second electrode plate, and a separator interposed therebetween;
   a case housing the electrode assembly;
   a cap plate having a terminal hole and an electrolyte injection hole;
   a supporter on the cap plate, the supporter comprising an elastic sponge material, the entire supporter being positioned between the terminal hole and the electrolyte injection hole; and
   a washer on the supporter, the washer having a first transparent part formed thereon, wherein a space into which a fluid can flow is between the washer and the cap plate;
   wherein the first transparent part is formed on only a portion of the washer and generally corresponds to the electrolyte injection hole.

2. The lithium ion secondary battery as claimed in claim 1, wherein the cap plate further comprises a safety vent, and wherein the washer further comprises a second transparent part generally corresponding to the safety vent.

3. The lithium ion secondary battery as claimed in claim 1, wherein the first transparent part comprises transparent resin.

4. The lithium ion secondary battery as claimed in claim 3, wherein the transparent resin comprises a material selected from the group consisting of polyethylene, polypropylene, polytetrafluoroethylene (TEFLON) polyethylene terephthalate, and polybutylene terephthalate.

5. The lithium ion secondary battery as claimed in claim 1, further comprising an insulating test material adjacent to the first transparent part and to the electrolyte injection hole for indicating a leak of electrolyte from the electrolyte injection hole.

6. The lithium ion secondary battery as claimed in claim 5, wherein the first transparent part is formed by punching the washer.

* * * * *